Feb. 5, 1952     M. W. HUMPHREYS     2,584,456
MACHINE TOOL
Filed Feb. 11, 1948
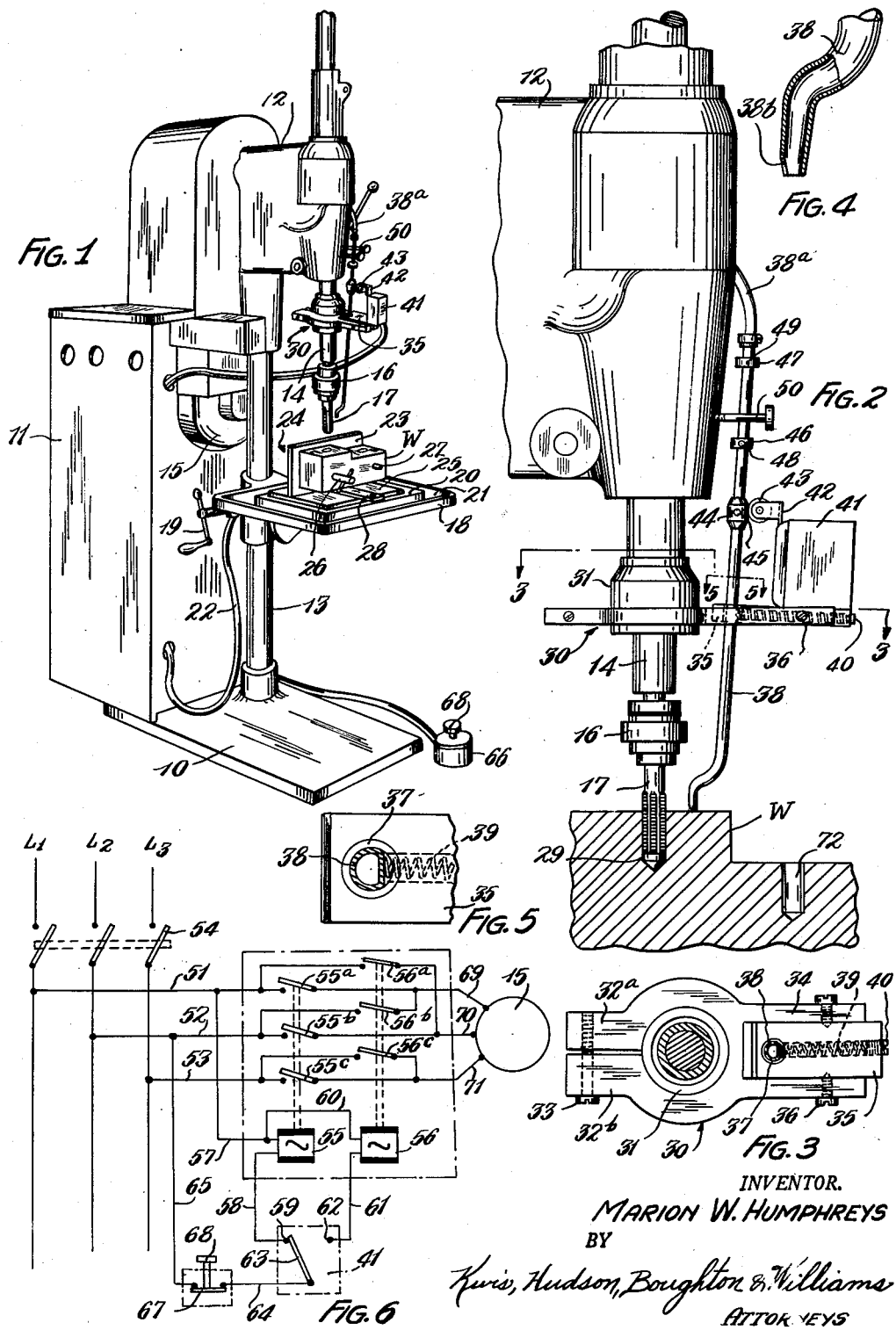
INVENTOR.
MARION W. HUMPHREYS
BY Kwis, Hudson, Boughton & Williams
ATTORNEYS Patented Feb. 5, 1952

2,584,456

UNITED STATES PATENT OFFICE 2,584,456

MACHINE TOOL

Marion W. Humphreys, Euclid, Ohio

Application February 11, 1948, Serial No. 7,651

3 Claims. (Cl. 10—129)

This invention relates to a machine tool and more particularly to an automatic depth control for tapping machines, drill presses, or the like.

When performing machining operations, such as drilling, tapping or the like, upon a workpiece it is essential to rapid and accurate work that means be provided for automatically terminating the operation when it has been completed to the desired depth. Prior devices for accomplishing this result have depended solely upon the extent of movement of the tool spindle for their operation. One of the chief disadvantages of such devices is that they must be reset each time the height of the workpiece is varied even though a drilling or tapping operation of the same depth is to be performed upon the several articles of different heights. For example, if a hole in a workpiece whose upper surface is three inches about the top of the work supporting table is to be tapped to a distance of ½ inch and a conventional device is employed to terminate the operation, the operation will be terminated when the end of the tap is 2½ inches above the surface of the table. If another workpiece whose upper surface is only 2¾ inches above the surface of the work supporting table is also to be tapped to a depth of ½ inch, and the device for terminating the operation is not reset, the tapping operation will be terminated, as before, when the lower end of the tap is 2½ inches above the upper surface of the work supporting table. Hence, the hole will only be tapped to a depth of ¼ inch instead of ½ inch as desired. Considerable time must therefore be expended in resetting the depth control for each different size of workpiece operated upon. A similar difficulty arises when such conventional controls are employed for drilling, counterboring or the like.

An object of this invention is to provide an improved machine tool which includes a novel control effective to automatically terminate a machining operation upon a workpiece when the tool has moved inwardly from the outer surface of the workpiece a preselected distance, and which control is effective to produce machining operations of predetermined length upon workpieces of different sizes without the necessity of readjustment for each size of workpiece.

Another object of the invention is to provide an improved machine tool, having a spindle upon which a tool is mounted, and including a novel control for automatically terminating a machining operation of the tool upon a workpiece, the said control comprising a member movable with and relative to the tool spindle and adapted to engage the outer surface of a workpiece to effect the actuation of the control so that the extent of the machining operation is automatically terminated after the tool has penetrated the work to a predetermined depth regardless of the size of the workpiece.

A further object of the invention is to provide an improved tapping machine comprising a tool spindle, a reversible electric motor for rotating and axially moving the tool spindle, and a control device for reversing the direction of rotation of said motor responsive to penetration of a tool on the spindle a preselected distance into the workpiece.

A still further object of the invention is to provide a machine tool of the type described in the preceding object and in which the said control includes a feeler member movable with the spindle and relative thereto and adapted to engage the outer surface of a workpiece to reverse the electric motor.

It is also an object of the invention to provide an improved machine tool of the type mentioned in the two preceding objects and in which the said feeler member provides a conduit for supplying cutting fluid to workpiece and to the tool on the tool spindle.

Another object of the invention is to provide a novel control device for a tapping machine, drill press or the like, which is effective to automatically terminate a tapping or like operation upon a workpiece when the tap or other tool has penetrated the workpiece a preselected distance regardless of the size of the workpiece.

The invention further resides in certain novel features of construction and combination and arrangements of parts, and further objects and advantages thereof will be apparent to those skilled in the art to which it pertains from the following description of the present preferred embodiment thereof, described with reference to the accompanying drawing in which similar reference characters represent corresponding parts in the several views and in which:

Fig. 1 is a perspective view of a tapping machine embodying the present invention;

Fig. 2 is an enlarged, fragmentary, side elevational view of a portion of the tapping machine shown in Fig. 1 and further illustrating the details of the novel control device;

Fig. 3 is a sectional view taken substantially on the section indicating line 3—3 of Fig. 2;

Fig. 4 is an enlarged, fragmentary view, partly in section and partly in elevation, of the lower end of the feeler member employed in the novel control device;

Fig. 5 is an enlarged fragmentary sectional view taken substantially on the section indicating line 5—5 of Fig. 2; and, Fig. 6 is a simplified wiring diagram of an electrical circuit for the machine shown in Fig. 1.

The invention is illustrated and hereinafter described with particular reference to its embodiment in a tapping machine. This is, however, by way of illustration only since the invention is susceptible of embodiment in a variety of other machines, such as drill presses or the like, and hence reference to a tapping machine is to be understood as being by way of example only and not intended as a limitation.

The tapping machine illustrated in the drawings comprises a base 10 upon which a vertical housing 11 is supported. The upper end of the housing 11 is provided with a forwarding projecting head 12 which is additionally supported from the base 10 by a vertical post or standard 13. The forward end of head 12 supports a tool spindle 14 for rotation and vertical axial movement by conventional means which are not shown but are contained in the head 12 and the housing 11 and are driven by a reversible electric motor 15 also supported in the housing 11. The lower end of the tool spindle 14 is provided with the usual chuck 16 for connecting a tool such as a tap 17 for rotation and axial movement with the spindle.

Intermediate the base 10 and head 12 the post or standard 13 is provided with a work-supporting table 18 which is clamped to the post 13 at any desired elevation by a conventional clamping means actuated by handle 19. The work-supporting table 18 may have any desired configuration but is here illustrated as comprising a centrally disposed planar portion 20 surrounded by a recess or trough 21 for collecting cutting fluid employed in the tapping operation, which cutting fluid is drained from the table by means of a conduit 22 and returned thereby to a reservoir, not shown, contained within the base of the housing 11. The cutting fluid is then recirculated to the tap as hereinafter described.

The work to be machined may be supported upon the table 18 in any desired manner. As illustrated, the workpiece W is clamped to the vertical leg or flange 23 of an inverted T-shaped jig, generally designated 24, the horizontal portion 25 of which rests upon the planar portion 20 of the work supporting table. As shown, the work is clamped to the vertical leg 23 of the jig by means of a screw threaded member 26 which is threaded upon the outer end of a stud or threaded shaft 27 extending through an opening in the workpiece W and connected with the vertical leg 23 of the jig. As shown in Fig. 1, two such studs or shafts 27 are employed thereby preventing rotative displacement of the workpiece relative to the jig and either or both of these studs or shafts 27 may be provided with a threaded clamping member such as 26.

Tilting of the jig relative to the work-supporting table is prevented by one or more hold-down means such as strap 28 which extends over the upper surface of the horizontal portion 25 of the jig and is connected to the work-supporting table by screws or the like. This hold-down strap may extend through a slotted opening in the vertical leg 24 of the jig and be connected to the work-supporting table on either side of the jig, or two or more relatively short hold-down means may be employed as desired. In either case, however, the jig is preferably slidable under the hold-down means. Other types of jigs or means for supporting a workpiece in fixed relationship to the tool may be employed and the invention is not restricted to the use of the particular work-supporting means illustrated.

The construction described thus far is such that when the motor 15 is energized for rotation in one direction the tool spindle 14, and the tap 17 thereon, are rotated and axially fed or moved in a direction for performing a tapping operation upon the workpiece W which has previously been supported and held in place upon the work table by any suitable means with an opening therein which is to be tapped vertically aligned with the tap 17. As the motor continues to rotate the tap will enter the hole or opening such as 29 in the workpiece tapping the hole to the desired depth whereupon the energization of the motor will be altered to reverse its direction of rotation so that the spindle and tap are now rotated in the opposite direction and are withdrawn from the work.

In accordance with this invention the reversal of the electric motor, which terminates the tapping operation and effects withdrawal of the tap or other tool from the work, is effected automatically by a mechanism responsive to the extent of movement of the tap as measured from the surface of the workpiece inwardly thereof, the operation of the mechanism being independent of the height of the work.

For this purpose a supporting platform, generally designated 30, is clamped to a collar 31 which is integral with, or connected to, a non-rotatable sleeve surrounding and axially movable with the tool spindle 14. As most clearly shown in Fig. 3, the platform 30 includes a central portion which is generally circular and has a central opening therethrough adapted to fit about the collar 31. This central portion of the platform is provided with an outwardly extending portion which is divided into two spaced arms 32a and 32b by a slot extending centrally therethrough and communicating with the opening in the central portion. The arms 32a and 32b are provided with a transversely extending bore for receiving a suitable screw 33, the end of the screw being threaded into a tapped portion of the bore in one of the arms so that the arms may be drawn together by means of the screw and thus clamp the platform 30 to the collar 31. Also extending outwardly from the central portion of the platform is a bifurcated portion 34 and within the bifurcation of this portion 34 is positioned an auxiliary platform 35 which is mounted for tilting relative to the platform 30 by means of pointed screws, or the like, 36 extending through the arms of the bifurcated portion 34 and engaging in openings in the sides of the platform 35.

The auxiliary platform 35 is provided adjacent one end thereof with a circular opening in which a bushing 37 is mounted, see Fig. 5. A feeler member 38 is slidingly supported in the bushing 37, the feeler member having portions extending vertically above and below the platform 35 on either side thereof. The feeler member 38 is frictionally held at an adjusted position relative to the platform 35 by means of a compression spring 39 which is positioned in a longitudinally extending bore in the auxiliary platform 35 with its inner end engaging a flattened surface on the side of the feeler member 38 and its outer end abutting an adjustable plug 40 or the like, which plug is threaded in the outer end of the longitudinal bore in the platform 35 to effect adjustment of the force of the spring. The plug 40 is preferably so adjusted that the feeler 38 is held from displacement relative to the platform 35 by its own weight but may be easily moved in either direction with respect to the platform by the application of a relatively small force.

Also mounted upon the platform 35 is an electrical switch 41 which may be of any suitable type adapted, when actuated in one direction, to open one circuit and substantially simultaneously close another circuit and, when actuated in the reverse direction, to close the first circuit and substantially simultaneously open the second. Such switches are well know in the art and hence their mechanical details need not be described, it being sufficient to note that the switch is actuated in one direction by means of a spring, not shown, and is actuated in the other direction by movement of its arm 42, the outer end of which is provided with a roller 43 for cooperation with a collar 44 provided on the feeler member 38. The collar 44 may have any suitable configuration but is here shown as comprising a central cylindrical portion and frusto-conical end portions, the latter providing cam-like surfaces to facilitate actuation of roller 43 and arm 42.

The collar 44 has a sliding fit upon the feeler 38 and may be fixedly held thereto in any desired position by means of a set screw or the like 45. The feeler member 38 is further provided with two spaced adjustable stop members 46 and 47 which are here shown as collars slidably mounted upon the feeler member and connected thereto for movement therewith by set screws, or the like, 48 and 49. The collars 46 and 47 are positioned on either side of a pair of pins 50 extending outwardly from the head 12 in a manner such that the upper end of the feeler member 38 may slidingly pass therebetween, the collars 46 and 47 being of sufficient diameter to abut the pins 50 and thereby limit the movement of the feeler 38 with respect thereto. The outer end of the pins 50 are provided with heads to prevent the feeler 38 from being laterally displaced therefrom. Instead of the pins 50 it will be readily understood that a slotted plate or other suitable means may be provided.

Referring now to Fig. 6 of the drawing, it will be seen that electrical power for operating the tapping machine is furnished from a three phase power supply, indicated by the wires L1, L2, and L3, to which the motor 15 is connected by wires or leads 51, 52 and 53, a circuit breaker 54 being interposed between the main power lines and the leads 51, 52 and 53 for the motor. Energization of the motor 15 from the leads 51, 52 and 53 is under control of relays 55 and 56 which, in turn, are controlled by the switch 41. Thus, one end of the coil of the relay 55 is connected with the lead 51 by a wire 57, a wire 58 leading from the other end of the coil of relay 55 to one contact 59 of the switch 41. The wire 57 is also connected to one end of the coil of relay 56 by a wire 60, the other end of the coil of relay 56 being connected by a wire 61 to a second contact 62 of the switch 41. The movable contact member 63 of the switch 41, which is actuated by the arm 42, is normally spring biased in a conventional manner for engagement with one of the contacts, such as 59, but is moved when the collar 44 engages the roller 43 to a position in which it engages the contact 62. The movable contact 63 is connected to the power lead 52 by means of wires 64 and 65 between which a foot operated switch 66 is interposed. The switch 66 has a movable contact 67 which is normally spring pressed to closed position but may be moved to open position by depressing the button 68 connected therewith. The relay 55 is provided with contacts 55a, 55b and 55c which are connected to move together to circuit closing position when relay 55 is energized, the contacts returning to open position upon deenergization of the relay as is well known in the art. The relay 56 is likewise provided with contacts 56a, 56b and 56c which move together to circuit closing position when relay 56 is energized and move to open position when the relay 56 is deenergized.

In the circuit as illustrated in Fig. 6, closing of the circuit breaker 54 results in energization of relay 55 since the circuit therefor is closed from L1 and lead 51 through wire 57, the coil of the relay 55, wire 58, contacts 59, 63, wire 64, contact 67, and wires 65 and 52 to power supply lead L2. The energization of relay 55 moves its contacts 55a, 55b and 55c to closed position thereby connecting the power supply leads 51, 52 and 53 to the leads 69, 70 and 71 of the motor 15. The motor 15 will therefore be energized to rotate the tool spindle and tap or other tool and move these elements vertically downward to effect a tapping or other machining operation upon a workpiece. When this machining operation has been completed the feeler member 38 is in engagement with the workpiece so that relative movement between this member and the platform 35 now occurs which causes the roller 43 to engage the collar 44 thus moving the contact 63 from engagement with contact 59 and into engagement with contact 62. This deenergizes relay 55 and substantially simultaneously energizes relay 56 since the circuit is now completed from L1 through wires 51, 57, 60, the coil of relay 56, wire 61, contacts 62 and 63, wire 64, contact 67, and wires 65 and 52 to wire L2.

Deenergization of relay 55 will have opened its contacts 55a, 55b and 55c so that the rotation of the motor 15 in the first direction is terminated. The almost immediate energization of relay 56, however, closes its contacts 56a, 56b, 56c thereby completing a circuit to the motor 15 from the wire 51 through the contact 56a to the motor lead 70; from the lead 52 through the contact 56b to the motor lead 69 and from the lead 53 through the contact 56c to the motor lead 71. Hence, the motor 15 is energized in a manner such that it now rotates in a reverse direction so that the tool spindle and tool are withdrawn from the work and continue to move in this direction of withdrawal until the collar 46 on the feeler member engages the pins 50 thereby causing the roller 43 of the switch 41 to move out of engagement with collar 44. The contact 63 is then moved by the biasing means, not shown, in the switch from engagement with contact 62 and back in engagement with contact 59 thereby deenergizing relay 56 and substantially simultaneously reenergizing relay 55. Consequently, the motor 15 will be energized to again move the tool spindle and tool in a direction to effect a machining operation.

In accordance with the illustrated form of the mechanism of this invention, the feeler member 38 is a hollow tube the upper end of which is connected by a flexible conduit 38a with a suitable pump, not shown, within the housing 11. This pump supplies cutting fluid from the previously mentioned reservoir within the housing to and through the conduit 38a and feeler member 38, the cutting fluid then emerging from the bottom of the feeler member adjacent the tap. Preferably the feeler member 38 is provided adjacent its lower end with a notch or cut-out portion 38b on the side adjacent the tap 17, see Fig. 4, so that when the lower end of the feeler member is in engagement with the upper surface of the workpiece the flow of cutting fluid therefrom is not impeded.

Having thus described the details of construction of the mechanism its operation is as follows:

When it is desired to tap a hole such as 29 in the workpiece W to a predetermined depth the work spindle and tap are moved downwardly until the lower end of the tap is disposed the desired distance below the upper surface of the workpiece W. This may be effected by disposing the feeler 38 in a manner such that the collar 44 does not contact the roller 43 during the operation and hence the motor 15 will be effective to tap the hole until terminated by the operator actuating the foot switch 66. After the hole has been tapped to the desired depth the motor 15 is held deenergized either by continued use of the switch 66 or by opening the circuit breaker 54. The operator then manually grasps the feeler 38 and pulls it downwardly until the lower end thereof engages the upper surface of the workpiece adjacent the hole to be tapped, it being noted that in the present construction the auxiliary platform 35 is tiltable and the end of the feeler has been so bent that it can be disposed closely adjacent the hole to be tapped since this hole may be located in a surface of relatively small area on the workpiece.

With the feeler 38 thus positioned, the set screw 45 of collar 44 is loosened and the collar is moved until it engages the roller 43 and moves the latter sufficiently to rock arm 42 thereby moving the switch arm 63 to its other circuit closing position. Set screw 45 is then tightened, the parts being positioned substantially as shown in Fig. 2. The adjustable collar 46 is next moved along the rod 38 and fixed thereto by the screw 48 at a position such that the distance between it and the lower surface of the pins 50 is equal to the desired depth of tapping in the workpiece plus the amount of clearance desired between the tap and the workpiece when the former is withdrawn from the latter. The collar 47 is then positioned on and clamped to the feeler 38 at a location such that, if the spindle 14 be moved downwardly when no workpiece is in place, the collar 47 would engage the upper surface of the pins 50 before the tap 17 encounters the upper surface of the work table.

This initial setup may also be effected without actually tapping a hole in a workpiece by simply moving the rod 38 until it engages the upper surface of the workpiece and then setting the collar 44 upon the rod 38 a distance below the roller 43 equal to the desired depth of the tapping operation to be performed in the work plus the distance which the lower end of the tap is separated from the upper surface of the workpiece during the setting operation. The collar 46 is then set relative to the pins 50 to provide the desired amount of clearance of the tap with respect to the workpiece. Either mode of setup will produce the same result.

With the apparatus set up in either of the two ways described above and with the tap withdrawn from the work as shown in Fig. 1, the collar 44 is disposed below the roller 43. Tapping operations are then started by closing the circuit breaker 54 and/or releasing the switch 66 if the latter has been actuated. This results in the contact 63 of the switch 41 engaging contact 59 thereby energizing relay 55. Energization of relay 55 completes the circuit to the motor 15 through the contacts 55a, 55b and 55c, the motor 15 being energized in a direction which causes the tool spindle 14 and tap 17 to be rotated and fed towards the workpiece. As the tap enters the hole 29 and proceeds to effect the tapping operation the lower end of the feeler 38 engages the upper surface of the workpiece since the platforms 30 and 35 are moved with the tool spindle and the feeler 38 is frictionally held to move therewith by means of the spring 39. When the feeler 38 engages the workpiece its downward movement is terminated and further downward movement of the tap and tool spindle causes the platforms 30 and 35 to move relative to the feeler 38. Hence, the switch 41 is carried downwardly relative to the collar 44 and, when the tapping operation has been completed to the desired depth for which the collar 44 has been set, the latter engages roller 43 thereby moving contact 63 of the switch 41 from engagement with contact 59 and into engagement with contact 62. This deenergizes relay 55 terminating rotation of the motor 15 in the direction which produces tapping and substantially simultaneously therewith relay 56 is energized thereby closing the contacts 56a, 56b and 56c and energizing motor 15 for rotation in the reverse direction.

The work spindle and tap will now be withdrawn from the work by moving vertically upward, the feeler 38 being carried with the platforms 30 and 35 and, hence with the spindle 14, due to the action of spring 39 in producing a frictional grip upon the feeler, the collar 44 remaining in engagement with roller 43 since the feeler 38 and the switch 41 now move together. This upward motion of the mechanism is continued until the collar 46 contacts the pins 50 terminating upward movement of the collar 46 while the spindle 14 and the switch 41 continue to move upwardly. Consequently, the roller 43 moves above collar 44 so that the contact 63 of the switch 41 returns to its position in engagement with contact 59. This deenergizes relay 56 thereby opening contacts 56a, 56b and 56c and terminating energization of motor 15 in the direction which effects upward movement of the tap. Substantially simultaneously therewith the relay 55 is energized by the engagement of contact arm 63 with the contact 59 so that the contacts 55a, 55b and 55c are closed to energize motor 15 for rotation in the direction which causes movement of the work spindle and tap in a downward direction.

As previously mentioned, the collar 46 is set so that the reversal of the motor 15 does not occur until the tap 17 has cleared the workpiece, the amount of this clearance being sufficient so that the operator may reposition the workpiece for effecting tapping of a different hole while the tap is descending for engagement therewith. In the illustrated construction this repositioning may be effected by simply sliding the jig 24 over the surface of the table 18, the hold-down means 28 permitting this sliding operation but preventing tilting of the jig.

It will be observed that the workpiece illustrated in the drawing has two openings to be tapped located in portions of the workpiece the upper surfaces of which are at different elevations. Assuming that the mechanism has been adjusted for tapping the hole 29 in the portion of the workpiece having the greater elevation and that tapping is now to be effected in a second hole such as 72 located in the portion of the workpiece having a lesser elevation, the tapping operation may be effected without the necessity of resetting the mechanism since the extent of the tapping operation is controlled by the extent of movement of the tap inwardly of the workpiece and not simply by the overall distance of movement of the tap. That is to say, with the work spindle and tap moving downwardly, the tap will now enter the hole 72 and the tapping will continue until the lower end of the feeler 38 engages the surface of the workpiece adjacent the hole 72 and is moved sufficiently by further tapping to bring the collar 44 into engagement with the roller 43, this then operating the switch 41 to reverse the direction of energization of motor 15, as previously described, thereby withdrawing the tap from the workpiece. It will be readily evident that by such a construction the depth of tapping of the two holes 29 and 72 is exactly the same even though the upper surfaces of the two portions of the workpiece are at different elevations and this result is the same whether the hole 29 or the hole 72 be first tapped.

If the hole 72 is to be first tapped, the collar 46 should be initially set so that the clearance between the end of the tap and the workpiece, when the former is withdrawn from the latter, is sufficient to clear the higher portion of the workpiece in order that the latter may be moved thereunder for the subsequent tapping of the hole 29. The amount of this clearance, which is controlled by the setting of the collar 46, may be as much as desired since it does not affect the accurate depth of tapping of the work; however, it is generally desirable to set the collar 46 so that the height of clearance is the minimum consistent with the length of time needed to position the workpiece under the tap. If, however, the collar 46 is set for a relatively great clearance of the tap and it is found that this is excessive, it is not necessary to wait for the tool spindle to move upwardly until collar 46 effects reversal of the motor 15. Instead, the operator may reverse the motor 15 and start the tool spindle and tap downwardly by simply grasping the feeler 38 and moving the latter into engagement with the surface of the portion of the workpiece in which the hole is located that is to be tapped. This moves the collar 44 from engagement with the roller 43 of the switch 41 effecting reversal of rotation of the motor as previously described. This mode of operation does not, however, prevent the mechanism from terminating the tapping operation when it has been completed to the predetermined depth since the position of the collar 44 has not been changed on the feeler 38, the only result being that greater relative movement occurs between the switch 41 and the collar 44 after the feeler 38 is in contact with the workpiece and before the collar actuates the switch.

While the invention has been described in considerable detail as applied to a tapping machine it will be readily apparent that it may be employed in a drill press or with similar types of machine tools. It will also be apparent that the invention may be incorporated in a machine at the time of its manufacture or may be added later as an attachment. Moreover, while the machine shown employs a reversible motor, it will be readily apparent that the invention is also applicable to a machine tool having a tool spindle which is driven by a single direction power means through reversing gear arrangements controlled by clutches or the like. In such a machine the relays 55 and 56 would control circuits to suitable solenoids for operating the clutches. Furthermore, while the feeler member 38 has been disclosed as being hollow for the purpose of supplying the cutting fluid therethrough it will be apparent that this member may be made as a solid rod if desired and the cutting fluid supplied in a conventional manner by a separate tube or the like. Other modifications and adaptations of the invention will readily occur to those skilled in the art and hence the invention is not to be considered to be limited to the exact details of construction herein illustrated and described but only as required by the spirit and scope of the appended claims.

Having thus described my invention, I claim:

1. A machine tool of the character described comprising a spindle mounted for rotation and axial movement, a reversible electric motor operatively connected with said spindle to effect movement thereof, means on said spindle adapted to support a tool for movement therewith to thereby effect a machining operation upon a workpiece, a non-rotatable support connected with said spindle for axial movement therewith, a feeler member frictionally mounted on said support for axial movement therewith and relative thereto with a portion of said feeler member positioned to contact a workpiece adjacent the region thereof in which the tool carried by said spindle effects a machining operation, electrical switch means mounted on said support adjacent said feeler member, means operatively connecting said switch means to said motor in a manner to reverse the direction of rotation of the latter upon actuation of the former, means on said feeler member adapted to engage and operate said switch means upon relative movement between said feeler member and spindle as the result of engagement of said feeler member with said workpiece and continued axial movement of said spindle thereby terminating the machining operation when the tool has moved inwardly from the surface of the workpiece a predetermined distance, the said feeler member having a passageway therethrough terminating in an opening adjacent the lower end thereof, and cutting fluid supplying means in communication with the said passageway in the feeler member whereby the latter serves both to control the machining operation and conduct cutting fluid to the workpiece and tool.

2. A machine tool as defined in claim 1 and in which the said means on the feeler member is adjustable therealong so that the extent of the machining operation upon the workpiece is preselected by adjustment of the said means.

3. A machine tool of the character described comprising a spindle mounted for rotation and axial movement, a reversible electric motor operatively connected with said spindle to effect movement thereof, means on said spindle adapted to support a tool for movement therewith to thereby effect a machining operation upon a workpiece, a non-rotatable support connected with said spindle for axial movement therewith, a feeler member frictionally mounted on said support for axial movement therewith and relative thereto with a portion of said feeler member positioned to contact a workpiece adjacent the region thereof in which the tool carried by said spindle effects a machining operation, electrical switch means mounted on said support adjacent said feeler member, means operatively connecting said switch means to said motor in a manner to reverse the direction of rotation of the latter upon actuation of the former, settable means on said feeler member adapted to engage and operate said switch means upon relative movement between said feeler member and spindle as the result of engagement of said feeler member with said workpiece and continued axial movement of said spindle thereby terminating the machining operation when the tool has moved inwardly from the surface of the workpiece a predetermined distance, and an adjustable member on said feeler member positioned to engage a relatively stationary portion of said machine tool when said feeler member is moved relative to said spindle in the direction for effecting withdrawal of the tool from the workpiece, whereby the said means on the feeler member is moved from engagement with said switch means so that the latter returns to its initial position and thereby effects a second reversal of the direction of rotation of said motor.

MARION W. HUMPHREYS.

REFERENCES CITED

The following references are of record in the file of this patent:

UNITED STATES PATENTS

| Number | Name | Date |
|---|---|---|
| 564,223 | Quint | July 21, 1896 |
| 885,914 | Dalton | Apr. 28, 1908 |
| 1,057,132 | Einicher | Mar. 25, 1913 |
| 1,112,198 | Davis | Sept. 29, 1914 |
| 1,195,145 | Mattingly | Aug. 15, 1916 |
| 1,219,537 | Dalton | Mar. 20, 1917 |
| 1,588,856 | Shaw | June 15, 1926 |
| 1,700,668 | Damerell | Jan. 29, 1929 |
| 2,360,059 | Hohwart | Oct. 10, 1944 |
| 2,368,359 | Hellstrom | Jan. 30, 1945 |
| 2,414,515 | Field | Jan. 21, 1947 |